US012784711B2

(12) United States Patent
Menachem et al.

(10) Patent No.: US 12,784,711 B2
(45) Date of Patent: Nov. 3, 2026

(54) FOLLOWER MODE VIDEO OPERATION

(71) Applicant: Apple Inc., Cupertino, CA (US)

(72) Inventors: Assaf Menachem, Hod Hasharon (IL); Itai Lanel, Haifa (IL); Peter F Holland, Los Gatos, CA (US); Uri Nix, Haifa (IL)

(73) Assignee: Apple Inc., Cupertino, CA (US)

(*) Notice: Subject to any disclaimer, the term of this patent is extended or adjusted under 35 U.S.C. 154(b) by 281 days.

(21) Appl. No.: 18/537,781

(22) Filed: Dec. 12, 2023

(65) Prior Publication Data

US 2025/0111835 A1 Apr. 3, 2025

Related U.S. Application Data

(60) Provisional application No. 63/586,352, filed on Sep. 28, 2023.

(51) Int. Cl.
*G09G 5/12* (2006.01)
*G06F 3/14* (2006.01)

(52) U.S. Cl.
CPC ............. *G09G 5/12* (2013.01); *G06F 3/1431* (2013.01); *G09G 2360/04* (2013.01); *G09G 2370/04* (2013.01)

(58) Field of Classification Search
CPC .. G09G 5/12; G09G 2360/04; G09G 2370/04; G09G 5/18; G06F 3/1431; G06F 3/1446
See application file for complete search history.

(56) References Cited

U.S. PATENT DOCUMENTS

| | | | | |
|---|---|---|---|---|
| 5,227,863 | A | 7/1993 | Bilbrey et al. | |
| 7,324,114 | B2 | 1/2008 | Mutanen et al. | |
| 8,732,496 | B2 | 5/2014 | Wyatt | |
| 8,736,700 | B2 | 5/2014 | Côtéet al. | |
| 11,062,674 | B2 | 7/2021 | Ansar et al. | |
| 11,544,031 | B2 | 1/2023 | Harviainen | |
| 2017/0168520 | A1* | 6/2017 | Yu | G06F 1/12 |
| 2018/0165053 | A1 | 6/2018 | Kuo et al. | |
| 2019/0073176 | A1* | 3/2019 | Holland | G06F 3/14 |
| 2020/0064902 | A1* | 2/2020 | Holland | G06T 1/60 |
| 2020/0066202 | A1* | 2/2020 | Bae | G09G 5/393 |
| 2021/0067830 | A1* | 3/2021 | Batmunkh | H04N 21/44204 |
| 2022/0114957 | A1* | 4/2022 | Lee | G09G 5/003 |

FOREIGN PATENT DOCUMENTS

WO 2007112019 A2 10/2007

* cited by examiner

*Primary Examiner* — Temesghen Ghebretinsae
*Assistant Examiner* — Sosina Abebe
(74) *Attorney, Agent, or Firm* — Fletcher Yoder, P.C.

(57) ABSTRACT

An electronic device may include a display and image processing circuitry. The image processing circuitry may receive a frame of image data for display by the display and at least one external display coupled to the electronic device, where the frame of image data comprises an active portion and an idle portion, wherein the active portion comprises data for presenting one or more images via the display and the at least one external display, receive a signal from a controller during the idle portion of the frame of image data, and initiate processing of a first line of active portion in response to receiving the signal. In this way, the frame of image data being displayed by the display and the at least one external display may be in sync.

20 Claims, 12 Drawing Sheets

FOLLOWER MODE VIDEO OPERATION

CROSS-REFERENCE TO RELATED APPLICATIONS

This application claims priority to U.S. Application No. 63/586,352, filed Sep. 28, 2023, entitled “FOLLOWER VIDEO MODE VIDEO OPERATION,” which is incorporated by reference herein in its entirety for all purposes.

BACKGROUND

The present disclosure relates generally to employing different modes of operation in an electronic device using signals between different display devices.

An integrated electronic display may operate using a common clock signal with corresponding image processing circuitry. External displays, however, may not use the same common clock signal. When preparing image data for display via an external display, the common clock signal and a clock signal for the external display may drift with respect to each other.

SUMMARY

The present disclosure relates generally to electronic displays and, more particularly, to improving coordination between two electronic devices to display image data using two or more electronic displays. As mentioned above, an integrated electronic display may operate based on a common clock signal with image processing circuitry (e.g., display pipeline) of the electronic device. The image processing circuitry may prepare image data for the electronic display and the electronic display may display the image data on the basis of the common clock signal. External displays, however, may not use the same common clock signals. For example, an external display may use a separate clock signal to coordinate the presentation of image data via the external display. However, when the image processing circuitry is employed to provide image data for the electronic display connected thereto and the external display, a drift between the two clock signals may cause image data provided to the external display and to the electronic device to become out of sync.

With the foregoing in mind, in some embodiments, the image processing circuitry of the electronic device may prepare image data for the external display, such that the image processing circuitry operates as a follower of the external display. Additionally or alternatively, the image processing circuitry may receive a signal from a software source that is in communication with the external display to operate as the follower. For example, the image processing circuitry may receive a frame of image data that includes a time period or portion of the frame of image data that corresponds to a Vertical Idle state. The image processing circuitry may wait for a follower-go signal during the Vertical Idle state to start processing a first line of the next frame. As such, the image processing circuitry and one or more external displays may remain in sync.

The frame scheduling techniques discussed herein may be extended across multiple external displays and/or an external display being driven by multiple clock signals. For example, a first display pipeline may drive a first half of the external display and a second display pipeline may drive a second half of the external display. The image processing circuitry may synchronize a first clock signal of the first display pipeline and a second clock signal of the second display pipeline coordinate display of the frame of image data that may be a merged (e.g., unified) image. To synchronize the clock signals, the image processing circuitry may round each clock signal based on a configurable number of bits. Additionally or alternatively, the image processing circuitry may use 2 least significant bits of each clock signal to determine a synchronized clock signal. In another example, a first display pipeline may drive a first external display, a second display pipeline may drive a second external display, and so on. The image processing circuitry may synchronize clock signals of the respective display pipelines prior to coordinating display the frame of image data that may be respective images for respective external displays. As such, the image processing circuitry may coordinate presentation of the image data based at least in part on the synchronized clock signal.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

As discussed above, image processing circuitry of an electronic device may prepare image data for the external display, such that the image processing circuitry operates as a follower of the external display. In this way, the external display may control the timing of the image processing circuitry. Additional details with regard to employing the image processing circuitry as a follower of the external display will be discussed below with reference to FIGS. 1-8.

Figure 1:
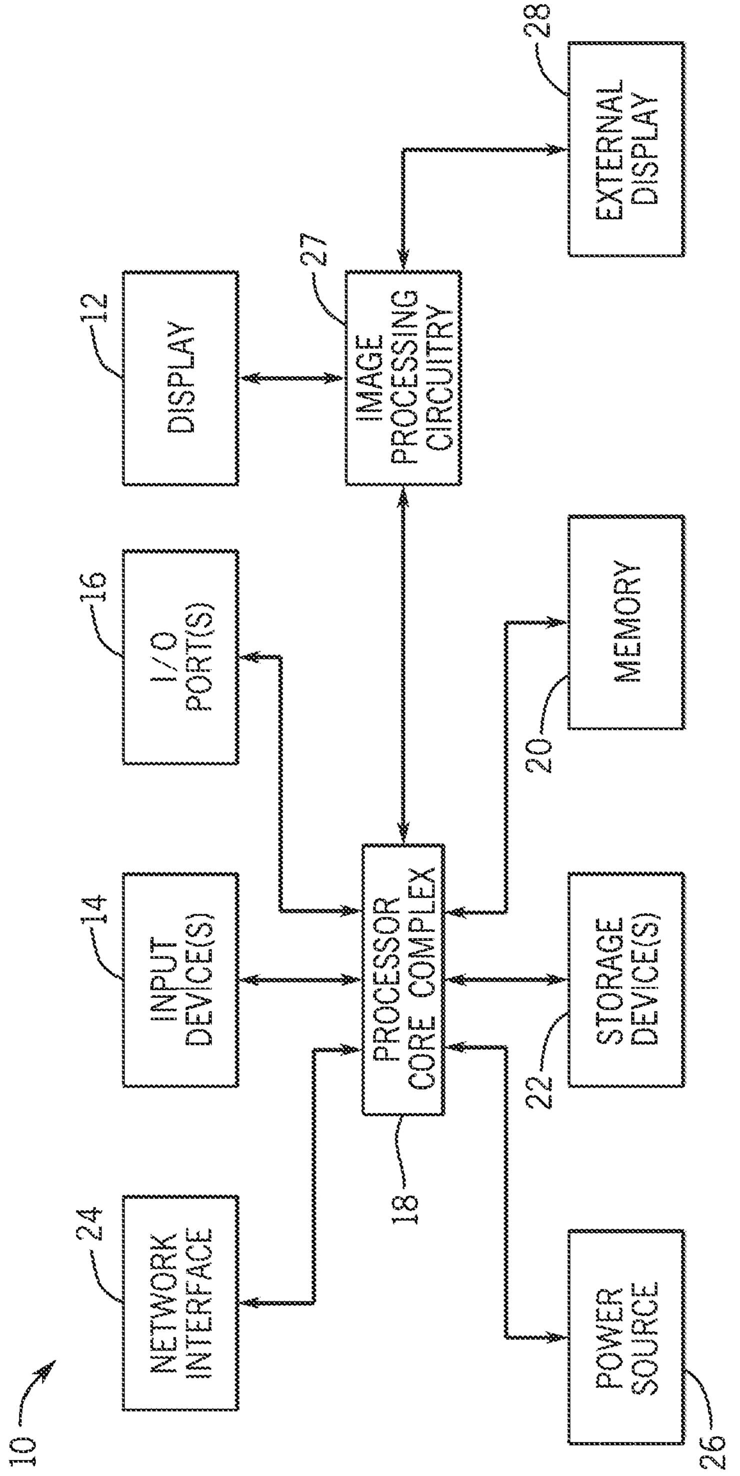
FIG. 1 is a block diagram of an electronic device that includes an electronic display, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components or reutilize display components in the electronic display 12. The touch sensing components may receive user inputs by detecting occurrence or position of an object touching the surface of the electronic display 12.

In addition to enabling user inputs, the electronic display 12 may include a display panel with display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

The electronic display 12 may receive image data to present via image processing circuitry 27. The image processing circuitry 27 or display pipeline may include one or more circuit components that process image data provided by the processor core complex 18 to enable the display 12 to present the image data. As such, the image processing circuitry 27 may include components to perform various operations, such as corrections (e.g., applying a Bayer filter), noise reduction, image scaling, gamma correction, image enhancement, color space conversion (e.g., between formats such as RGB, YUV or YCbCr), chroma subsampling, framerate conversion, image compression/video compression (e.g., JPEG), and computer data storage/data transmission.

In some embodiments, the electronic device 10 may be communicatively coupled to an external display 28. The external display 28 may correspond to an additional display device, such as a monitor, a tablet screen, or the like. In addition, the external display 28 may include electronic glasses, a handheld device, or any suitable display device that may be external or separate from the electronic device 10 and may present image data. The display 12 and the external display 28 may each operate using a respective clock signal provided by respective clock circuits. Additionally or alternatively, the external display 28 may operate using two or more clock signals provided by respective clock circuits. For example, a first clock signal may drive a first portion of the external display 28 and a second clock signal may drive a second portion of the external display 28 to present image data (e.g., merged image data, unified image data). In certain instances, the two or more clock signals that may drift relative to each other. As a result, the image data depicted on the external display 28 may become unsynchronized. If the first clock signal and the second clock signal become unsynchronized, then a frame of image data on the first portion may be displayed before the frame may be displayed on the second portion or vice versa. In other instances, the external display 28 may include two or more external displays 28 communicatively coupled to the electronic device 10. Each of the external displays 28 may operate using a respective clock signal to display image data, respectively. If the respective clock signals become unsynchronized, then image data presented on the respective external displays 28 may become unsynchronized. While the illustrated example includes one external display 28, as discussed above, the systems and techniques described herein may include two or more external displays 28 that operate using respective clock signals. For example, the external display 28 may include two or more external displays 28, three or more external displays 28, four or more external displays 28, five or more external displays 28, or any suitable number of external displays 28.

To better synchronize the presentation of the image data via the one or more external displays 28, the image processing circuitry 27 may receive a follower-go signal from a hardware source or a software source during a portion of time of a frame of the image data. The follower-go signal may be generated by a global timing master, relative to other events, such as another panel's refreshes or ISP image captures. For example, the follower-go signal generated by this global timing master may be used to initiate a new frame for display by the one or more external displays 28. Additionally or alternatively, the follower-go signal may be generated by a software source, such as from a controller.

Each frame of image data may include an IDLE portion in which the follower-go signal may be received from the hardware source or the software source. In response to receiving the follower-go signal, the image processing circuitry 27 may proceed to process the remaining portion of the frame of image data and provide the resultant image data to the one or more external display 28, such that the external displays 28 may present the image data more synchronously. Indeed, the follower-go signal may ensure that the one or more external displays 28 operate based on a common clock signal, thereby ensuring that the one or more of more-external displays 28 are synchronous.

Figure 2:
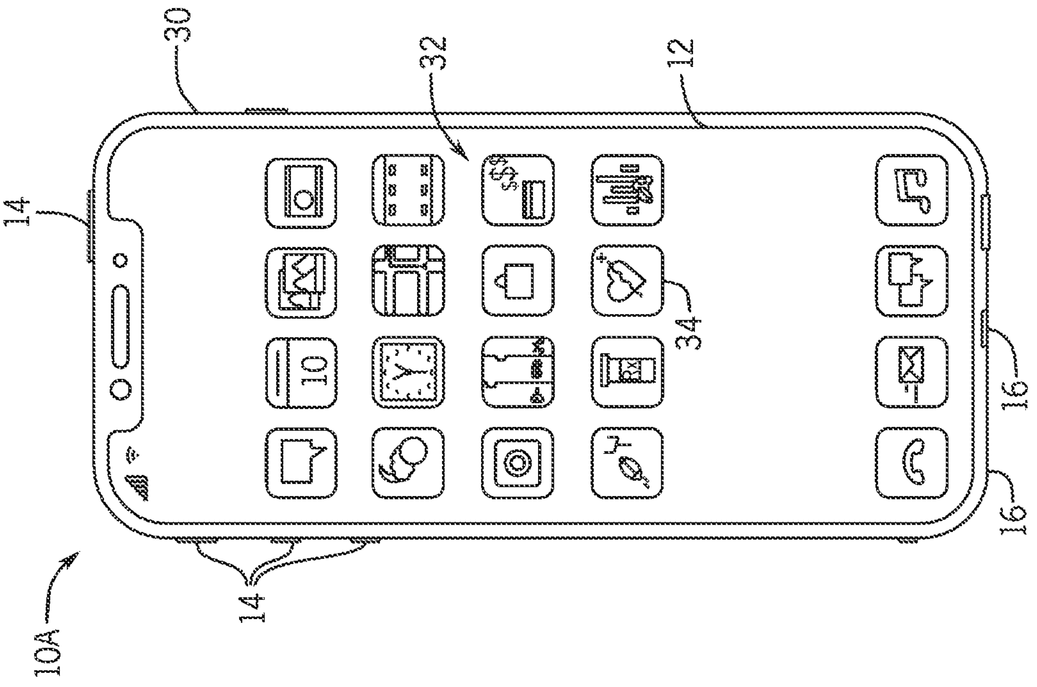
FIG. 2 is an example of the electronic device of FIG. 1 in the form of a handheld device, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
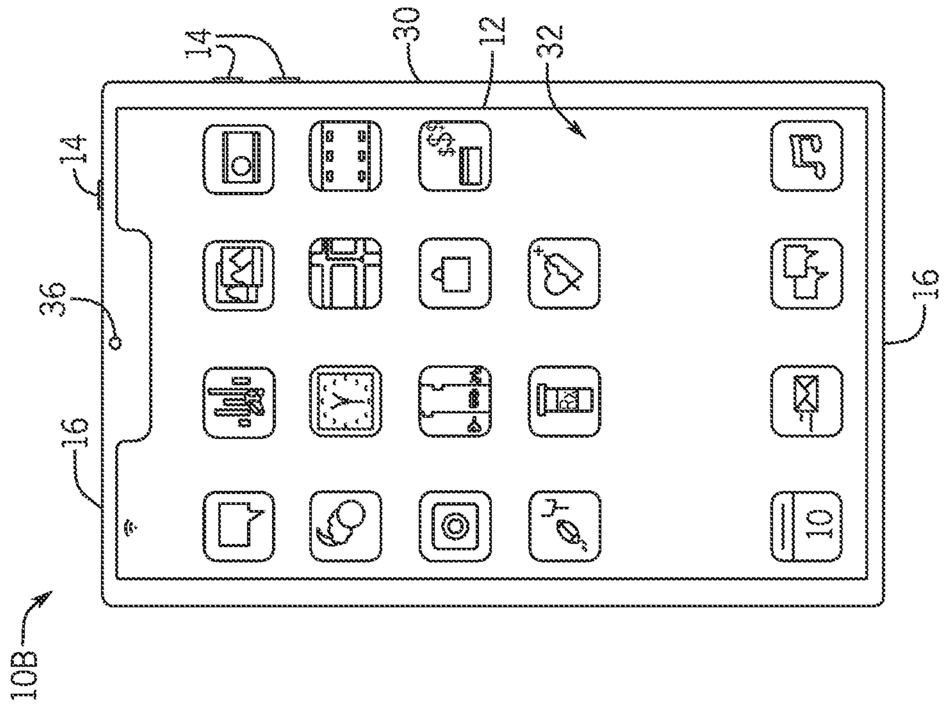
FIG. 3 is another example of the electronic device of FIG. 1 in the form of a tablet device, in accordance with an embodiment.
Figure 4:
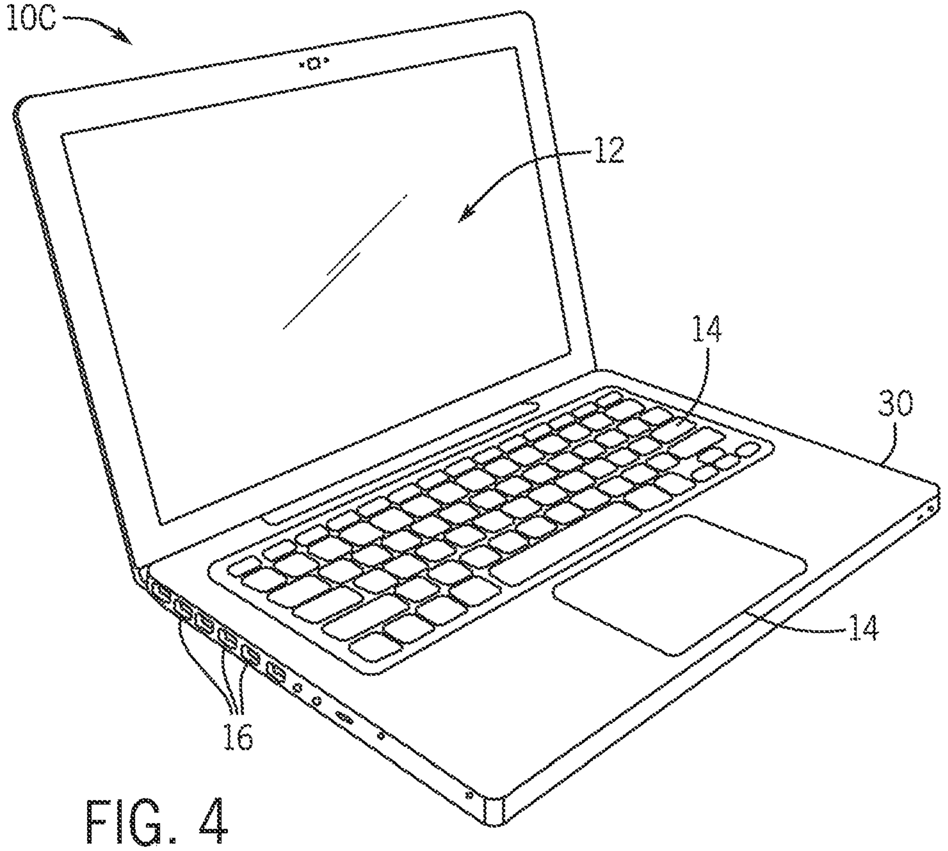
FIG. 4 is another example of the electronic device of FIG. 1 in the form of a computer, in accordance with an embodiment.
Figure 5:
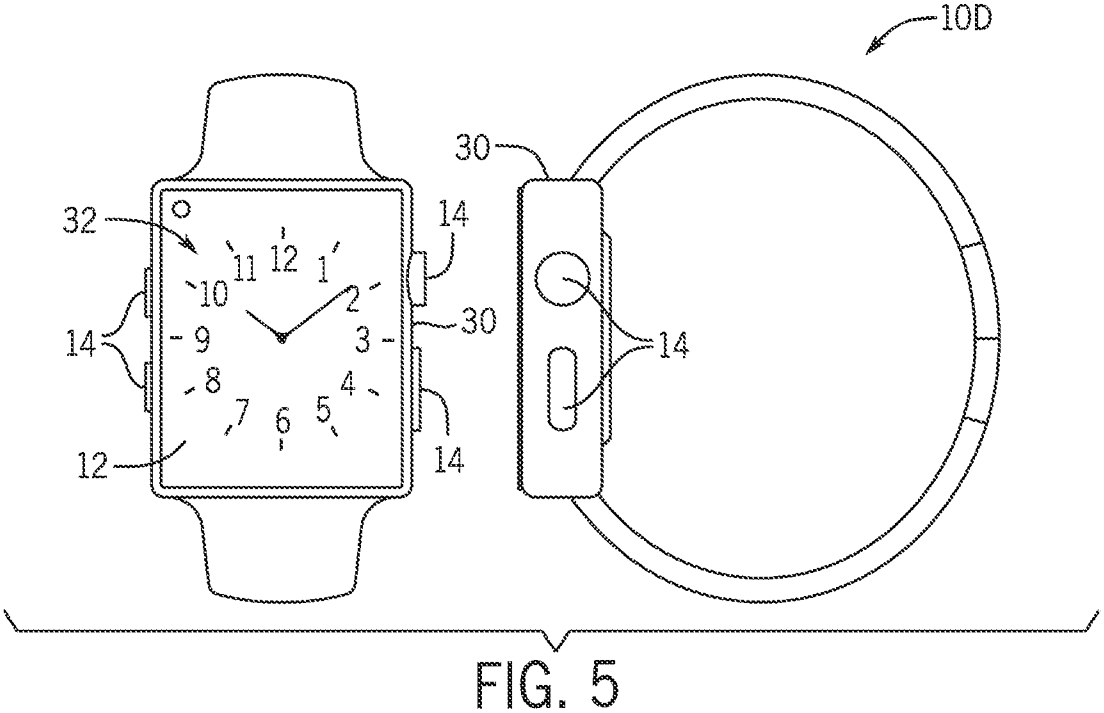
FIG. 5 is another example of the electronic device of FIG. 1 in the form of a watch, in accordance with an embodiment.

Another example of a suitable electronic device 10, specifically a tablet device 10B, is shown in FIG. 3, and may include a camera 36. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
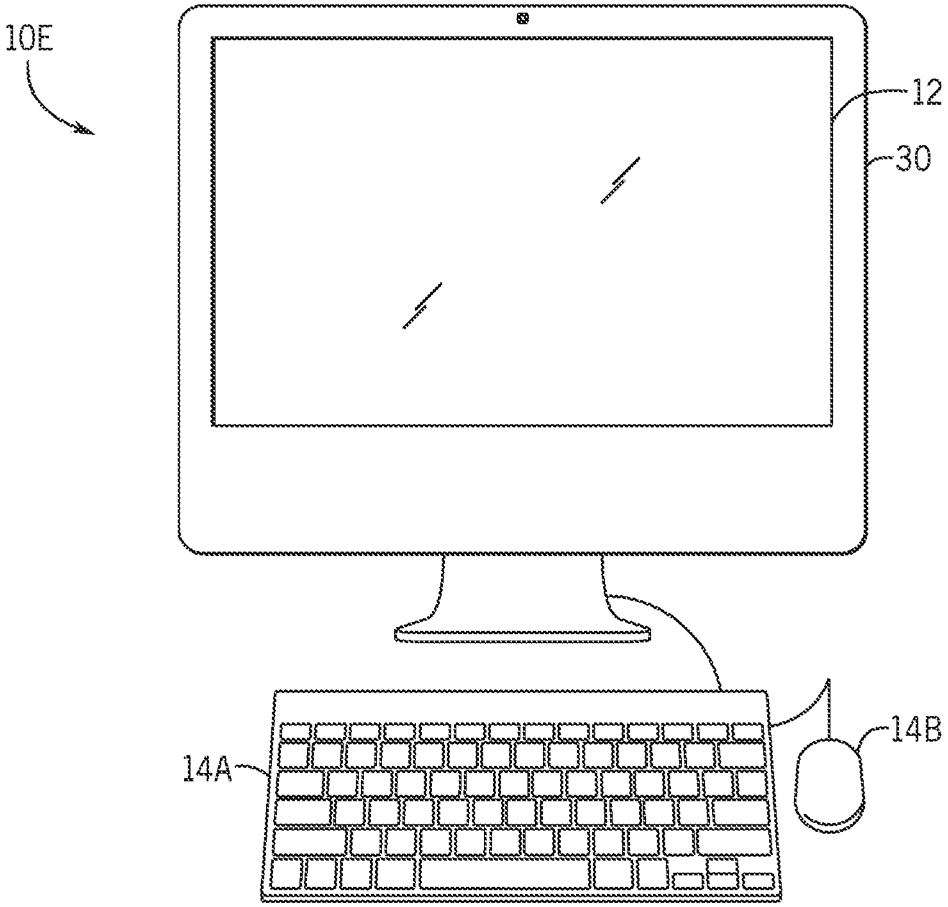
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. The enclosure 30 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Another example of a suitable electronic device 10, specifically a tablet device 10B, is shown in FIG. 3, and may include a camera 36. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. The enclosure 30 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
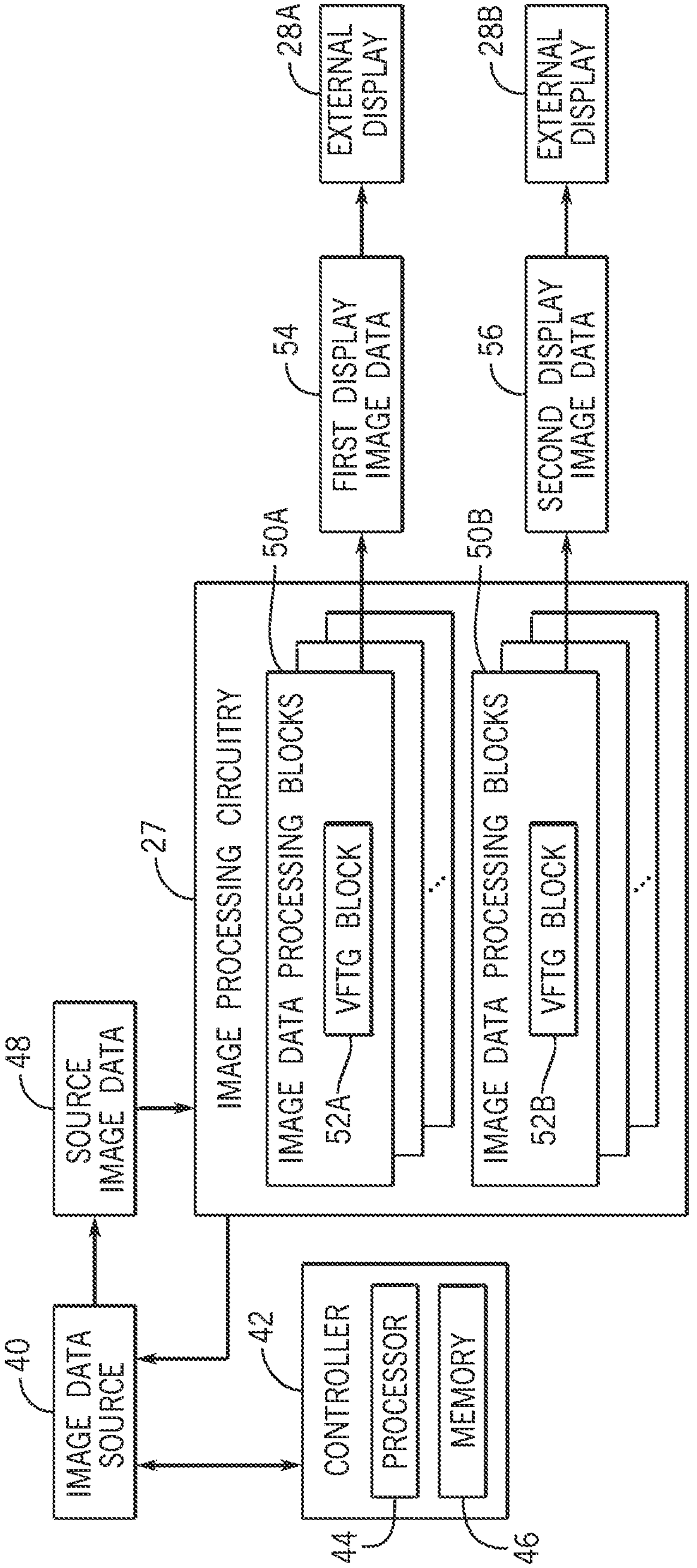
FIG. 7 is a block diagram of a portion of the image processing circuitry of FIG. 1 in communication with one or more external displays, in accordance with an embodiment.

To help illustrate, a portion of the electronic device 10, including image processing circuitry 27, is shown in FIG. 7. The image processing circuitry 27 may be implemented in the electronic device 10. For example, the image processing circuitry 27 may be included in the processor core complex 18, a timing controller (TCON) in the electronic display 12, or any combination thereof. As should be appreciated, although image processing is discussed herein as being performed via a number of image data processing blocks, embodiments may include hardware and/or software components to carry out the techniques discussed herein.

The electronic device 10 may also include an image data source 40 and/or a controller 42 in communication with the image processing circuitry 27. The electronic device 10 may be communicatively coupled to a first external display 28A and a second external display 28B, which may also be in communication with the image processing circuitry 27. In certain instances, the first external display 28A and the second external display 28B (collectively referred to herein as "external displays 28") may be different portions of the same display that may be communicatively coupled to the electronic device 10. In other instances, the first external display 28A and the second external display 28B may be different displays that may be respectively coupled to the electronic device 10. While the illustrated example includes two external displays 28, as discussed above, any suitable number of external displays 28 may be included. For example, a third external display and a fourth external display may be different portions of the same display or may be different displays coupled to the electronic device 10.

In some embodiments, the external displays 28 may include a display panel that may be a self-emissive display (e.g., organic light-emitting-diode (OLED) display, micro-LED display, etc.), a transmissive display (e.g., liquid crystal display (LCD)), or any other suitable type of display panel. In some embodiments, the controller 42 may control operation of the image processing circuitry 27, the image data source 40, and/or the external displays 28. To facilitate controlling operation, the controller 42 may include a controller processor 44 and/or controller memory 46. In some embodiments, the controller 42 (e.g., the controller processor 44 and/or controller memory 46) may be included in (e.g., a part of or implemented as) the processor core complex 18, the image processing circuitry 27, a timing controller (TCON) in the display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 27 may receive source image data 48 corresponding to a desired image to be displayed on the external displays 28 from the image data source 40. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. Moreover, as used herein, pixel data/values of image data may refer to individual color component (e.g., red, green, and blue) data values corresponding to pixel positions of the display panel.

As described above, the image processing circuitry 27 may operate to process the source image data 48 received from the image data source 38. The image data source 38 may include captured images (e.g., from one or more cameras), images stored in memory, graphics generated by the processor core complex 18, or a combination thereof. Additionally or alternatively, the image processing circuitry 27 may include one or more image data processing blocks 50 (e.g., circuitry, modules, or processing stages) such as a burn-in compensation (BIC)/burn-in statistics (BIS) block. For example, the image processing circuitry 27 may include a first set of image data processing blocks 50A that includes a first video follower timing generator (VFTG) block 52A that follows the follower-go signal to transition to a new frame and a second set of image data processing blocks 50B that includes a second VFTG block 52B that follows the follower-go signal to transition to the new frame. The VFTG block 52 may be clock circuitry that generates a clock signal used to drive the external display 28. The image data processing blocks 50 may receive and process the source image data 48 and output display image data 54 in a format (e.g., digital format, image space, and/or resolution) interpretable by the display 12 and/or the external displays 28. Further, the functions (e.g., operations) performed by the image processing circuitry 27 may be divided between various image data processing blocks 50, and, while the term "block" is used herein, there may or may not be a logical or physical separation between the image data processing blocks 50.

After processing, the image processing circuitry 27 may output the display image data 54 to the external displays 28. In certain instances, the first display image data processing blocks 50A may generate first display image data 54 and second display image data 56 for the first external display 28A and the second external display 28B, respectively. For example, the first external display 28A and the second external display 28B may display different portions of a frame of image data. The first display image data 54 may correspond to a first portion of image data and the second display image data 56 may correspond to a second portion of the image data. In this way, the first external display 28A and the second external display 28B may appear to display one (e.g., merged, unified) image. In another example, the first external display 28A and the second external display 28B may each display respective image data that may be the same or different. The first display image data 54 and the second display image data 56 may appear to be similar or substantially similar across all of the external displays 28. In other instances, the first display image data 54 and the second display image data 56 may be different display image data. Based at least in part on the first display image data 54 and/or the second display image data 56, analog electrical signals may be provided, via pixel drive circuitry, to display pixels of the external display 28 to illuminate the display pixels at a desired luminance level and display a corresponding image.

Figure 8:
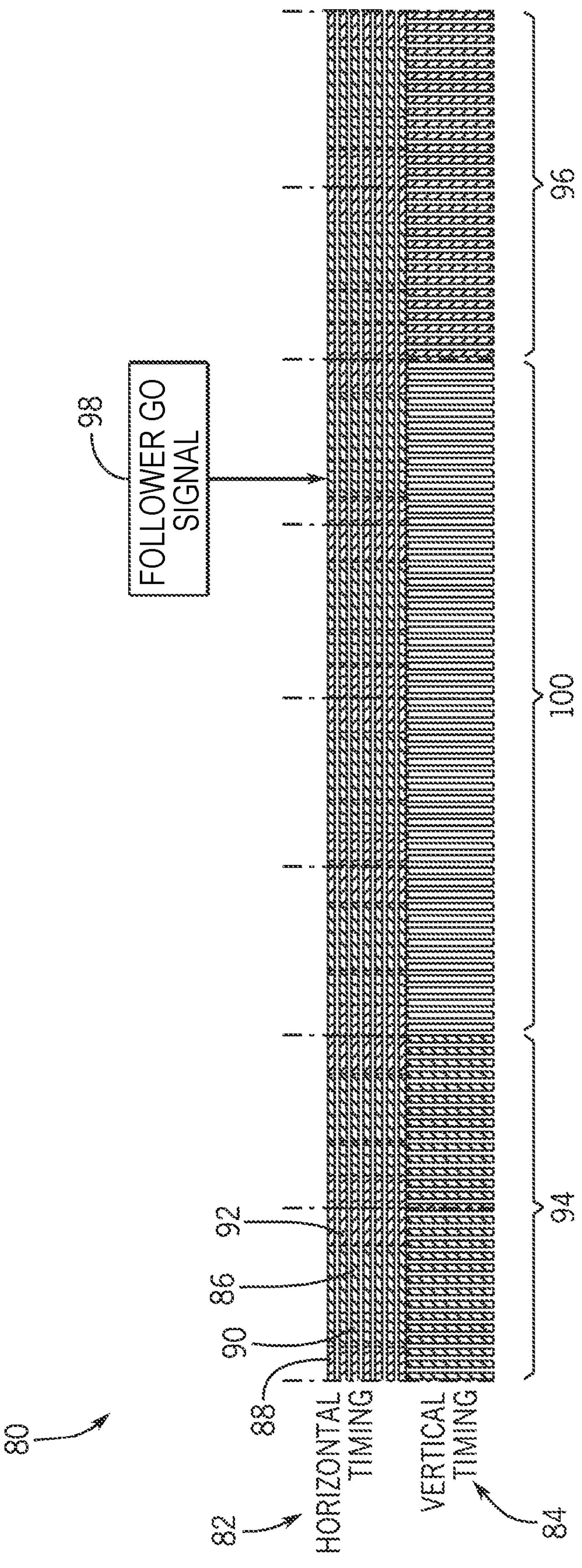
FIG. 8 is a timing diagram illustrating portions of a frame of image data being displayed on the one or more external displays of FIG. 7, in accordance with an embodiment of the present disclosure.

To control the display of the first display image data 54 and/or the second display image data 56, the image processing circuitry 27 may follow a follower-go signal received from a hardware source or a software source. FIG. 8 is a timing diagram 80 that illustrates portions of a frame of image data that may be displayed by the external display(s) 28, in accordance with embodiments described herein. Conceptually, video timing can be divided into two parts, the time it takes to display each line (referred to herein as "horizontal timing" 82) and the time it takes to display an entire frame (referred to herein as "vertical timing" 84). The horizontal timing 82 and the vertical timing 84 may be fixed for any given video timing.

The horizontal timing 82 may include two parts, an active portion during which visible emission may occur (referred to herein as "Horizontal Active Portion" 86) and a blanking portion during which no visible emission occur (referred to herein as "Horizontal Blanking Portion"). In addition, the Horizontal Blanking Portion may include three sections, a pulse indicating that an electron beam must be moved to the start of the next line (referred to herein as "Horizontal Sync Portion" 88), a period after the Horizontal Sync Portion 88 that provides the reference voltage level (referred to herein as "Horizontal Back Porch Portion" 90), and a period before the Horizontal Sync Portion 88 that provides a reference voltage level (referred to herein as "Horizontal Front Porch Portion" 92). During the Horizontal Front Porch Portion 92 and the Horizontal Back Porch Portion 90, the electron beam may be below a black voltage level to guarantee that no visible emission occurs.

The vertical timing 84 may correspond to displaying one frame of image content. Each frame may include two sets of lines, a set of active lines during which all emission occurs (referred to herein as "Vertical Active Portion" 94) and a set of blank lines during which no emission occurs (referred to herein as "Vertical Blanking Portion"). The Vertical Blanking Portion may also be divided into three sections, Vertical Sync Portion, Vertical Front Porch Portion 96, and Vertical Back Porch Portion, which may be similar to Horizontal Sync Portion 88, Horizontal Front Porch Portion 92, and Horizontal Back Porch Portion 90, respectively. To display the frame of image data, each line may begin with the start of Horizontal Sync Portion 88, and end with the end of Horizontal Front Porch Portion 92. In addition, each frame may begin with the start of Vertical Front Porch Portion 96, and end with the last line of the Vertical Active Portion 94.

Certain external display(s) 28 may operate using different techniques. For example, the external display(s) 28 may operate using horizontal blanking time periods (e.g., Horizontal Sync Portion, Horizontal Front Porch Portion, and Horizontal Back Porch Portion) that are equivalent to an even number of display pixels while the external displays 28 may use horizontal blanking time periods that are equivalent to an odd number of pixels, irrespective of the pixels per clock at which the respective VFTG block 52 operates. To synchronize respective clock signals of the external display(s) 28, follower-go signal 98 may be received by the VFTG blocks 52 during a Vertical Idle Portion 100 (IDLE portion discussed with respect to FIG. 1) of the frame. The Vertical Idle Portion 100 may occur immediately after the Vertical Active Portion 94. In some embodiments, the image processing circuitry 27 may receive the image data from the source image data 48 and depict images that are to be displayed via the external display(s) 28. If the image processing circuitry 27 receives the follower-go signal 98 from a hardware source or a software source during the Vertical Idle Portion 100, the image processing circuitry 27 may proceed to the Vertical Front Porch Portion 96 to start processing a first line of the next frame. For example, the image processing circuitry 27 may instruct the external display(s) 28 to start processing the first line of the next frame and display the first line of the next frame of image data at the same time. In this way, image data displayed on the external display(s) 28 may be synchronized.

In an embodiment, the follower-go signal 98 may be provided by the hardware source. For example, certain applications may involve coordinating the operation of the image processing circuitry 27, such that the video timing operations follows to an external component (e.g., external display 28). As such, the Vertical Idle Portion 100 may be used to facilitate a video timing coordination between the image processing circuitry 27 and the external display 28 such that the video timing of the image processing circuitry 27 can be implicitly adjusted based on an external trigger. By relying on the follower-go signal 98 to proceed to the next frame of image data, the image processing circuitry 27 may adapt its video timing to avoid drift between two entities running on clocks derived from different crystals. As such, image data displayed by the external display(s) 28 over time may be synchronized.

In another embodiment, the follower-go signal 98 may be provided by the software source. As such, the image processing circuitry 27 may adapt its video timing to avoid drift between two or more entities.

Figure 9:
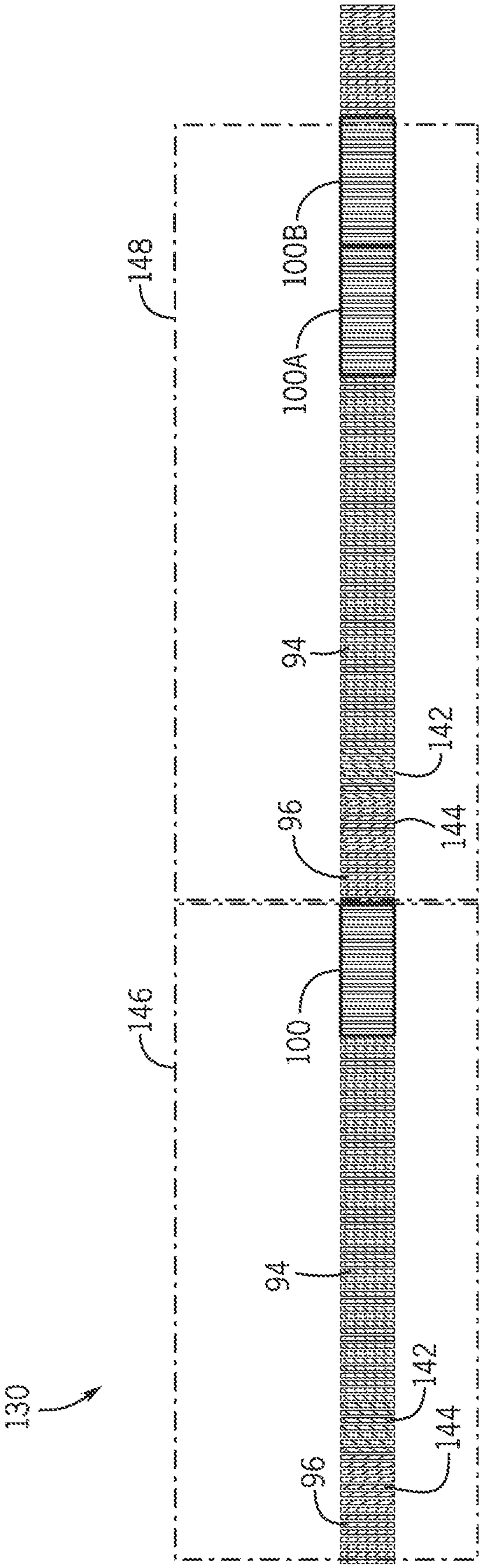
FIG. 9 is a timing diagram for displaying multiple frames of image data on the one or more external displays of FIG. 7, in accordance with an embodiment of the present disclosure.

FIG. 9 is a timing diagram 130 that illustrates displaying multiple frames of image data by the external display(s) 28, in accordance with embodiments described herein. Referring to FIG. 9, the display image data 54 and 56 may include frames N, N+1, and N+2. Each frame of the display image data 54 and 56 may include the Vertical Front Porch Portion 96, the Vertical Back Porch Portion 142, the Vertical Active Portion 94, the Vertical Sync Portion 144, and the Vertical Idle Portion 100. The Vertical Sync Portion 144 may include information regarding synchronization pulses that synchronizes the image data for vertical rows on the external display 28. The Vertical Front Porch Portion 96 and the Vertical Back Porch Portion 142 may provide buffering periods between the Vertical Sync Portion 144, such that the portion of the display image data 54 and 56 may be visible by the external display 28 during the active area (e.g., Vertical Active Portion 94) is specified. The Vertical Active Portion 94 may then provide the image data for the rows of pixels that are part of the external display(s) 28.

The frames of display image data 54 and 56 may include varying durations of the Vertical Idle Portion 100. The duration being extendable via the insertion of the Vertical Idle Portion 100 between the end of Vertical Active Portion 94 and the beginning of Vertical Front Porch Portion 96. The duration of the Vertical Idle Portion 100 may be configurable value, such as a configurable value, a configurable time duration, a configurable number of frames, and so on. Each time a Vertical Idle Portion 100 begins, a counter may be incremented and at the end of each Vertical Idle Portion 100, the counter may be compared with a threshold value. If the counter meets or exceeds the threshold value, then the count may be set to zero and a new frame may begin.

As illustrated, a first frame 146 of image data starts with the Vertical Front Porch, a Vertical Sync Portion, and the Vertical Active Portion. The first frame 146 may include one Vertical Idle Portion 100. During the Vertical Idle Portion 100, the image processing circuitry 27 may receive the follower-go signal 98 and transition to a second frame 148 of the image data. The second frame 148 of image data may include two Vertical Idle Portions 100. For example, during the first Vertical Idle Portion 100A, the image processing circuitry 27 may not receive the follower-go signal 98 and transition to a second Vertical Idle Portion 100B. During the second Vertical Idle Portion 100B, the image processing circuitry 27 may receive the follower-go signal 98 and transition to a third frame of image data.

Figure 10:
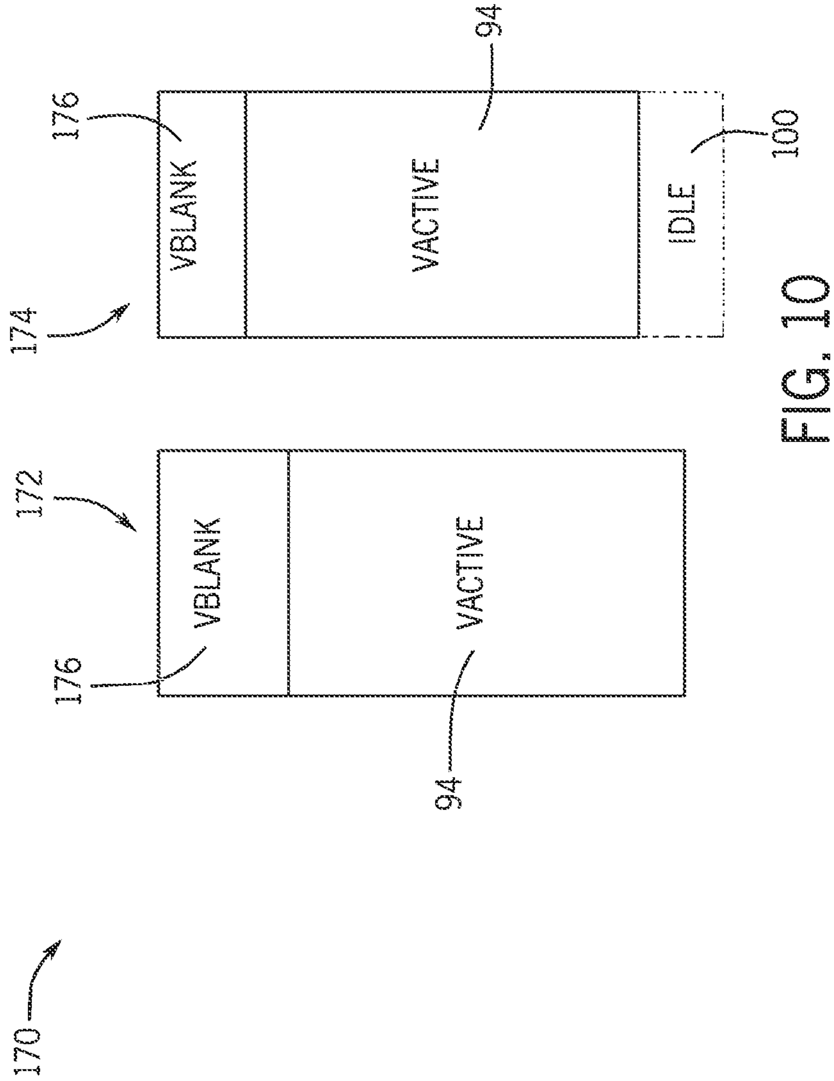
FIG. 10 is timing diagram for displaying the frame of image data using a first mode without Vertical Idle and a second mode with Vertical Idle, in accordance with an embodiment of the present disclosure.

FIG. 10 is a timing diagram 170 for displaying the frame of image data using a first mode 172 without the Vertical Idle Portion 100 and a second mode 174 with the Vertical Idle Portion 100, in accordance with embodiments described herein. The first mode 172 may be a fixed-rate video mode without the Vertical Idle Portion 100. In the first mode 172, the external display(s) 12 may refresh at a constant rate (e.g., 60 Hz) without changes to the duration of the various timing periods and without inactive periods between frames. For example, the electronic device 10 may cycle continuously through the four vertical timing states discussed with respect to FIGS. 8 and 9.

In the second mode 174, the external display(s) 28 may operate in a follower video mode that includes the Vertical Idle Portion 100. The duration of each frame may be extended by the image processing circuitry 27 by inserting a number of Vertical Idle Portions 100, adjusting a duration of the Vertical Idle Portion 100, and so on. The duration of each frame may not be known until shortly before the start of the next frame (e.g., subsequent frame), determining each frame's duration may be a constant process in which the Vertical Idle Portion 100 may be inserted once it is known that no new frame will start within the next Vertical Idle Portion 100. For example, the image processing circuitry 27 may stay in the Vertical Idle Portion 100 until the follower-go signal 98 may be received. The image processing circuitry 27 may transition the external display(s) 28 to a new frame of image data. For example, the frame of image data may be transitioned to the Vertical Front Porch Portion 96 after receiving the follower-go signal 98.

In another example, the duration of the frame may be 8 microseconds and the image processing circuitry 27 may receive a signal to present the frame at 10 microseconds. As such, the image processing circuitry 27 may insert 2 microseconds of Vertical Idle Portion 100 to increase the duration of the frame. For example, the external display(s) 28 may display the image data without any Vertical Idle Portions 100 at a refresh rate of 120 Hertz (Hz). The external display(s) 28 may display the image data with one Vertical Idle Portion 100 which may drop the refresh rate down to 80 Hz. Additionally or alternatively, the external display(s) 28 may display the image data with two Vertical Idle Portions 100 which may drop the refresh rate down to 60 Hz. The Vertical Idle Portions 100 may continue to be added until a follower-go signal may be received. However, the external display(s) 28 may include a minimum refresh rate that may be based on the type of electronic device 10, the type of external display(s) 28, and so on. For example, the external display(s) 28 may include a minimum refresh rate of 10 Hz. If the refresh rate drops to 10 Hz, the image processing circuitry 27 may transition the external display(s) 28 to the next frame of image data. As such, image data may be displayed without perceivable image artifacts. Additionally or alternatively, displaying the image data with one or more Vertical Idle Portions 100 may reduce power consumption by the electronic device 10 since image content may be generated and/or retrieved less often. When driving the external display(s) 28, power may be saved during periods of time in which no data is transmitted, such as during Vertical Blanking. The length of the Vertical Idle Portion 100 may be incremented by increasing the threshold value. Prior to initiating operation in the second mode 174, the respective clock signals and/or respective clock circuits of the external display(s) 28 may be synchronized. For example, the synchronization may include a time-based synchronization technique discussed with respect to FIGS. 11-14. As such, the first display image data 54 and the second display image data 56 may be at the same time or based on synchronized clock signals.

Figure 11:
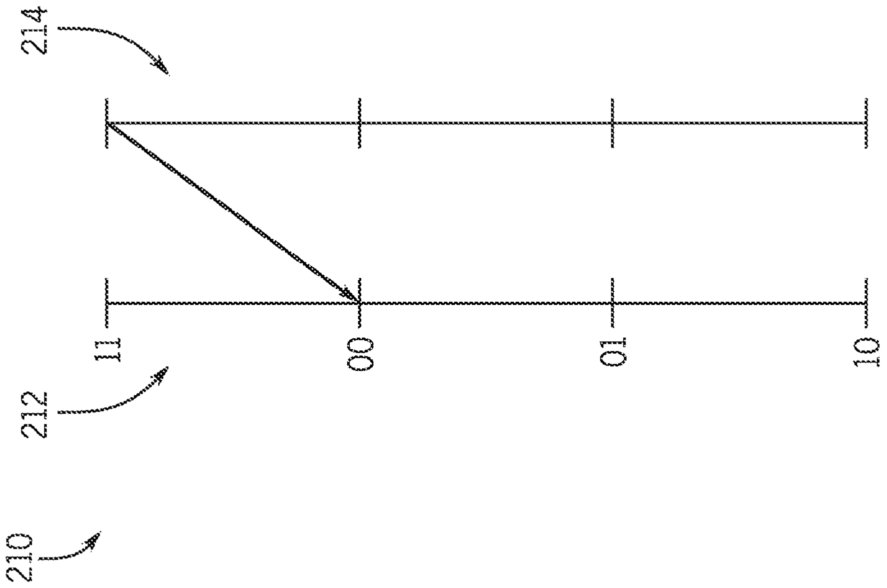
FIG. 11 is a timing diagram of synchronizing two clock circuits used to drive one or more external displays, in accordance with an embodiment of the present disclosure.

FIG. 11 is a timing diagram 210 that illustrates synchronizing two clock circuits used to drive one or more external displays 28, in accordance with embodiments described herein. In order to determine a synchronized time-base value (e.g., synchronized clock signal) for starting the frame of image data across each of the sets of image data processing blocks 50, the hardware source (e.g., global timing master) and/or the software source (e.g., the controller 42) may synchronize two least significant bits (LSB) using the time-based synchronization technique. The hardware source and/or the software source may receive a first time-base value 212 from a first set of image data processing blocks and a second time-base value 214 from a second set of image data processing blocks. For example, the time-base values 212 and 214 may be clock signals generated by the VFTG block 52, respectively. In other words, the time-base values 212 and 214 may be generated by clock circuits of the image processing circuitry 27.

Figure 15:
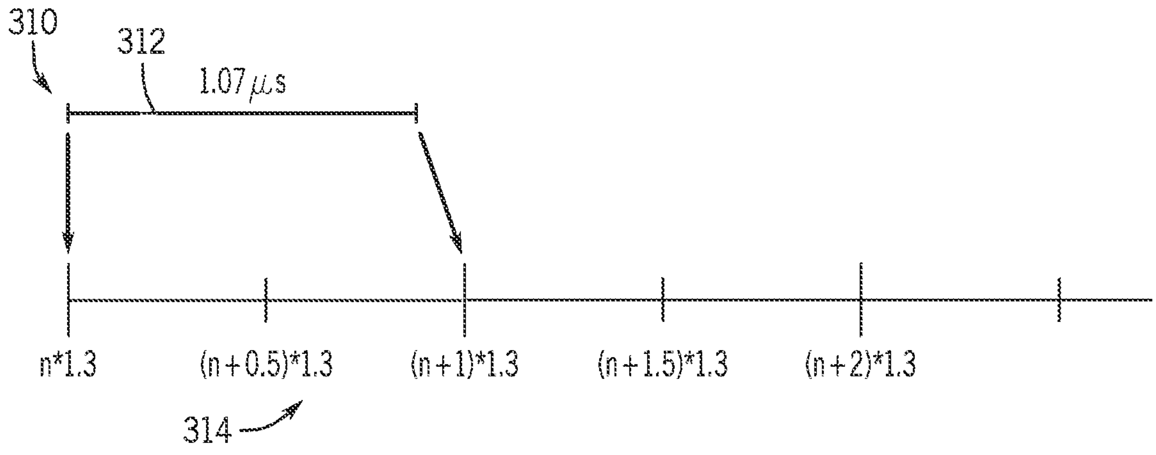
FIG. 15 is a timing diagram for rounding a time-base value, in accordance with an embodiment of the present disclosure.
Figure 16:
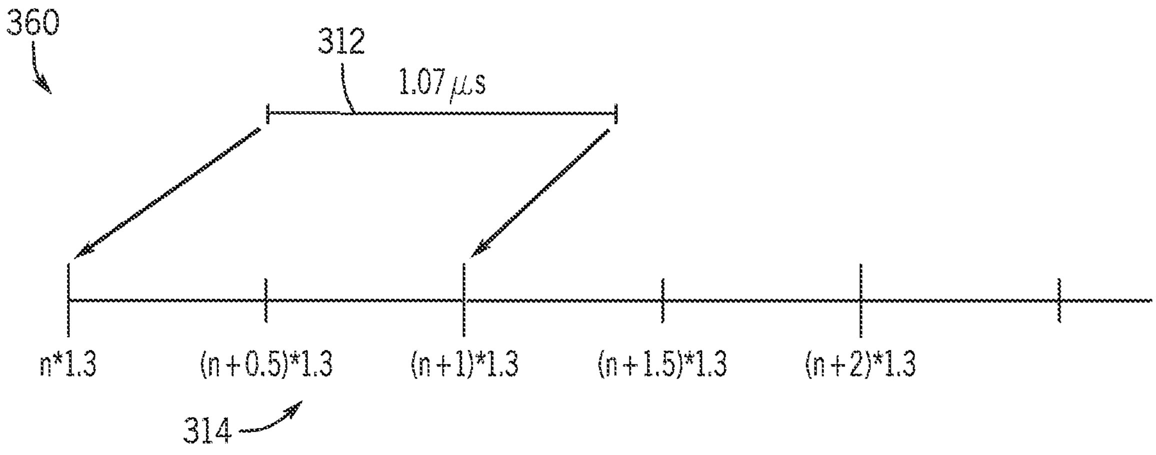
FIG. 16 is a timing diagram for rounding a time-base value, in accordance with an embodiment of the present disclosure.
Figure 17:
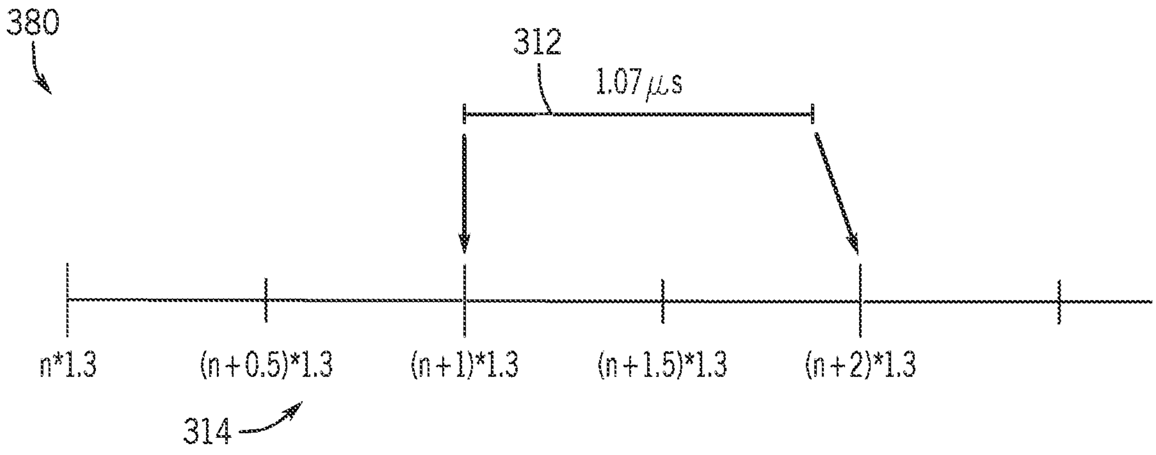
FIG. 17 is a timing diagram for rounding a time-base value, in accordance with an embodiment of the present disclosure.

As further described with respect to FIGS. 15-17, the first time-base value 212 and the second time-base value 214 may be rounded. For example, the first time-base value 212 may include 0×0 and the second time-base value 214 may include 0×3. The rounded first time-base value 212 may include 00 and the rounded second time-base value 214 may include 11. As illustrated, the rounded time-base values may include 11, 00, 01, and/or 10. As such, the difference between the time-base values may be at most 1 (referred to herein as "skew value"). In certain embodiments, the rounded time-base values may include additional time-base values or fewer time-base values.

The relationship between the first time-base value 212 and the second time-base value 214 may be determined. For example, the relationships may include the first time-base value 212 being greater than, less than, and/or equal to the second time-base value 214. When the relationship is identified, the synchronized time-base value may be the larger of the two. For example, as illustrated, the first time-base value 212 may be 00 and the second time-base value 214 may be 11. Since 11 is less than 00, the synchronized time-base value may be set to the first time-base value 212. That is, the first set of image data processing blocks 50A and the second set of image data processing blocks 50B may be driven based on the synchronized time-base value, which is illustrated as the second time-base value 214.

Figure 12:
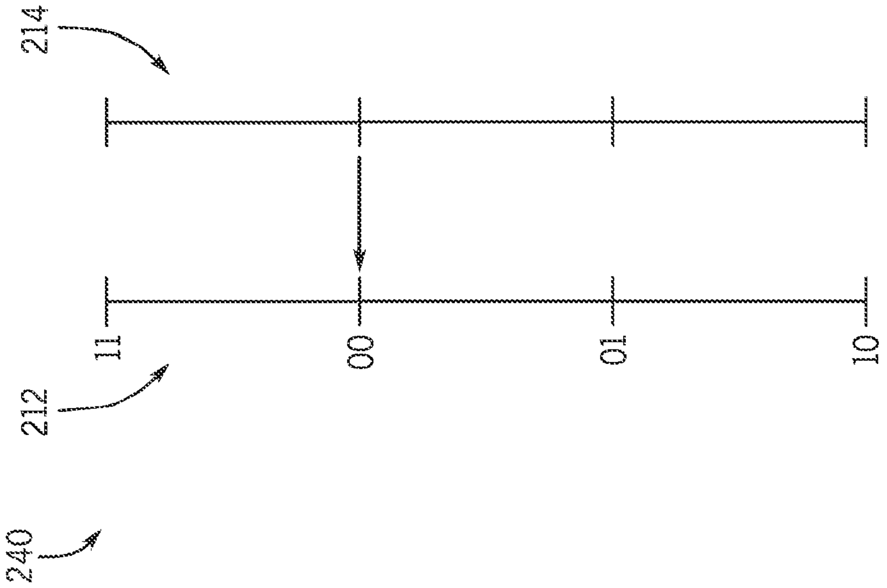
FIG. 12 is a timing diagram of synchronizing two clock circuits used to drive one or more external displays, in accordance with an embodiment of the present disclosure.

FIG. 12 is a timing diagram 240 that illustrates synchronizing two clock circuits used to drive one or more external displays 28, in accordance with embodiments described herein. In the illustrated example of FIG. 12, the first time-base value 212 may be 00 and the second time-base value 214 may also be 00. Since the first time-base value 212 and the second time-base value 214 may be equivalent, the first set of image data processing blocks 50A and the second set of image data processing blocks 50B may be set to the first time-base value 212. That is, the synchronized time-base value may be equal to the first time-base value 212.

Figure 13:
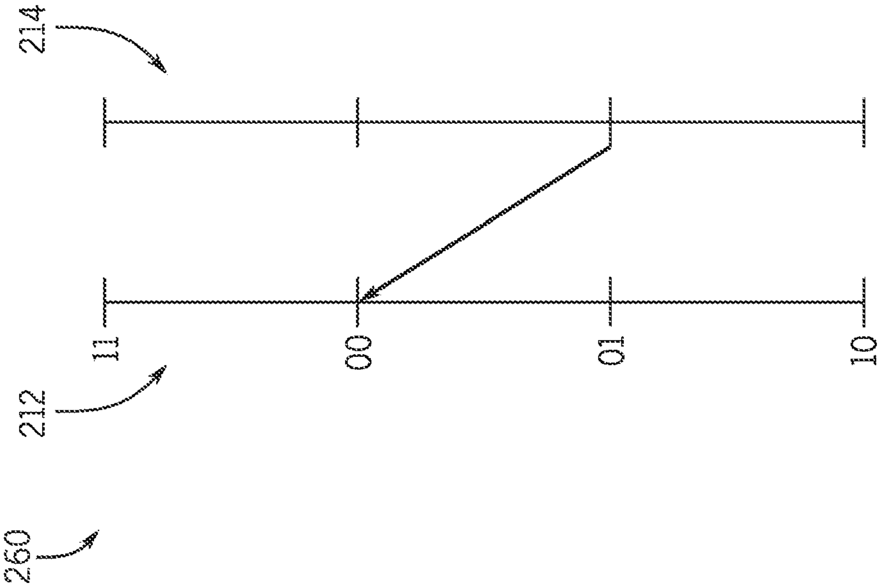
FIG. 13 is a timing diagram of synchronizing two clock circuits used to drive one or more external displays, in accordance with an embodiment of the present disclosure.

FIG. 13 is a timing diagram 260 that illustrates synchronizing two clock circuits used to drive one or more external displays 28, in accordance with embodiments described herein. In the illustrated example of FIG. 13, the first time-base value 212 may be 00 and the second time-base value 214 may be 01. Since the second time-base value 214 is greater than the first time-base value 212, the second time-base value 214 may be selected as the synchronized time-base value. For example, the first time-base value 212 may be incremented by 1 to be equivalent to the second time-base value 214.

Figure 14:
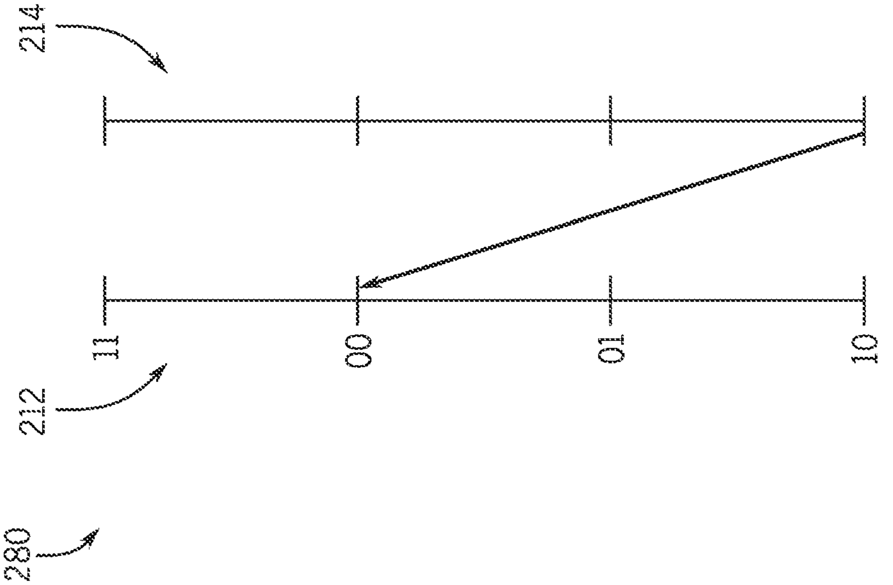
FIG. 14 is a timing diagram of synchronizing two clock circuits used to drive one or more external displays, in accordance with an embodiment of the present disclosure.

FIG. 14 is a timing diagram 280 that illustrates synchronizing two clock circuits used to drive one or more external displays 28, in accordance with embodiments described herein. In the illustrated example of FIG. 14, the first time-base value 212 may be 00 and the second time-base value 214 may be 10. The difference between the first time-base value 212 and the second time-base value 214 may be equivalent to 2, which is greater than 1. An error signal may be generated in response to the skew value being greater than 1. Additionally or alternatively, the synchronized time-base value may be set to the first time-base value 212.

As discussed herein, the image processing circuitry 27 may drive multiple sets of image data processing blocks 50. The time-base synchronization technique may be performed between each of the sets of image data processing blocks 50 to determine a difference between two time-base values being greater than 1 exists. To this end, the hardware source and/or the software source may receive a respective time-base value from each of the sets of image data processing blocks 50 determine a relationship between each of the time-base values. For example, the hardware source and/or the software source may receive 2 or more time-base values, 2 or more time-base values, 4 or more time-base values, 5 or more time-base values, 6 or more time-base values, or any suitable number of time-base values. If an error signal is not generated during the determination, then the image processing circuitry 27 may begin to drive the external display(s) 28 in the second mode. In this way, each of the sets of image data processing blocks 60 may receive the clock signal and process the clock signal in a synchronized manner. As such, clock signal drift between the image data processing blocks 50 may be reduced or eliminated.

FIGS. 15-17 illustrate a rounding technique used to adjust the time-base values and reduce the difference between each of the values to less than 1. If the time-base values are rounded to a value that may be larger than a maximum skew value between each of the values, then the difference between each of the values may not be greater than 1. The rounding technique may be performed prior to the synchronization technique. The time-base value may be rounded based on a number of rounding bits. For example, the rounding may increase the time-base value, decrease the time-base value, or maintain the time-base value. In the illustrated example, the number of rounding bits may include 11 bits, which corresponds to 1.3 microseconds. The number of rounding bits used may be configurable to support variance in a maximum skew value.

FIG. 15 is a timing diagram 310 that illustrates rounding of a time-base value 312, in accordance with embodiments described herein. The time-base value 312 may be based on a time 314 measured by a number of frames. As illustrated, the time 314 includes a first frame (N), a middle point of the first frame (N+0.5), a second frame (N+1), a middle point of the second frame (N+1.5), and a third frame (N+2), and so on.

The image processing circuitry 27 may round each time-base value corresponding to each respective set of image data processing blocks 50 to a nearest number of rounding bits. For example, the time-base value 312 may start at a beginning of the first frame and extend 1.07 microseconds. If the time-base value 312 starts at 0.0 microseconds, the time-base value 312 may be a total of 1.07 microseconds and be rounded up to 1.3 microseconds. If the time-base value 312 starts at 0.25 microseconds, the time-base value 312 may be a total of 1.32 microseconds and be rounded down to 1.3 microseconds.

FIG. 16 is a timing diagram that illustrates rounding of a time-base value 312, in accordance with embodiments described herein. In the illustrated example of FIG. 16, the time-base value 312 may start the middle point of the first frame (N+0.5) and extend 1.07 microseconds. The time-base value 312 may be equivalent to 1.72 and may be rounded down to the second frame (N+1). Additionally or alternatively, the start of the time-base value 312 may be rounded down to a beginning of the first frame or 0.0 microseconds. The time-base value 312 may extend from the beginning of the first frame for 1.07 microseconds, similar to the time-base value 312 described with respect to FIG. 15. As such, the time-base value 312 may be rounded to 1.3 microseconds.

FIG. 17 is a timing diagram that illustrates rounding of a time-base value 312, in accordance with embodiments described herein. In the illustrated example of FIG. 17, the time-base value 312 may start at the second frame (N+1) and extend for 1.07 microseconds. The time-base value 312 may be equivalent to 2.37 microseconds, which may be rounded up to 2.6 microseconds. Two 2 LSB from the rounded time-base value 312 may be used to determine the synchronized time-base value discussed with respect to FIGS. 11-14. As such, the skew value between two rounded time-base values 312 may be 1 or less.

Figure 18:
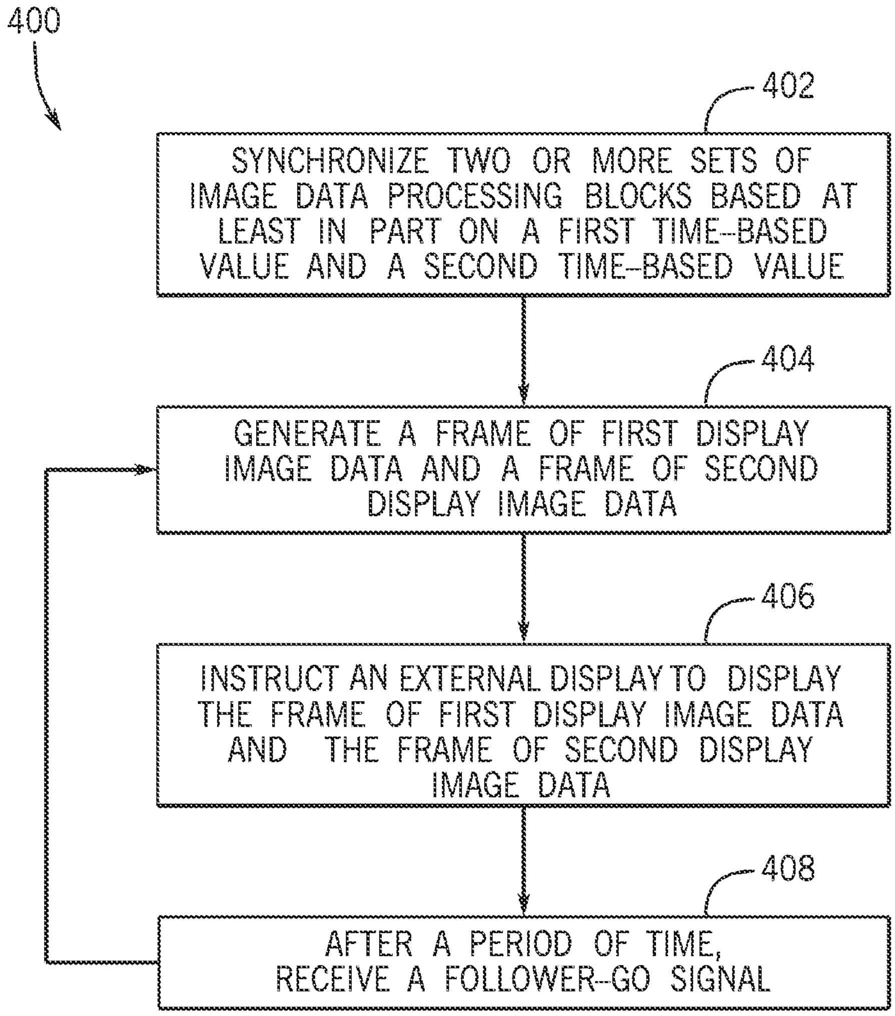
FIG. 18 is a flow chart of an example method for synchronizing two or more sets of image data processing blocks and displaying a frame of image data, in accordance with an embodiment of the present disclosure.

FIG. 18 is a flowchart of an example method 400 for synchronizing two or more sets of image data processing blocks 50 and displaying a frame of image data, in accordance with embodiments described herein. While the process of FIG. 18 is described using process blocks in a specific sequence, it should be understood that the present disclosure contemplates that the described process blocks may be performed in different sequences than the sequence illustrated, and certain described process blocks may be skipped or not performed altogether.

At block 402, two or more sets of image data processing blocks 50 may be synchronized. For example, the image processing circuitry 27 may receive a time-base value from each set of image data processing blocks 50 and round each of the time-base values based on a skew value. The image processing circuitry 27 may use two LSB of each time-base value to determine a relationship between each of the image data processing blocks 50. For example, the image processing circuitry 27 may determine a relationship between each of the time-base values as described with respect to FIGS. 11-14. A synchronized time-base value used to drive the sets of image data processing blocks 50 may be determined based on the relationships. In this way, the sets of image data processing blocks 50 may be synchronized and clock signal drift may be reduced or eliminated.

At block 404, a frame of first display image data 54 and a frame of second display image data 56 may be generated. For example, the image processing circuitry 27 may receive the source image data 48 from the image data source 40 and process the source image data 48. The first set of image data processing blocks 50A may generate the first display image data 54 and the second set of image data processing blocks 50B may generate the second display image data 56.

At block 406, the external display(s) 28 may be instructed to display the frame of the first display image data 54 and the frame of second display image data 56, respectively. During the Vertical Active Portion 94, the external display(s) 28 may emit light and create the frame of image content. The external display(s) 28 may transition to the Vertical Idle Portion 100 after the Vertical Active Portion 94. During the Vertical Idle Portion 100, the external display(s) 28 may continue to emit light and display the image content. The image processing circuitry 27 may continue to insert Vertical Idle Portions 100 until a follower-go signal 98 is received or a maximum number of Vertical Idle Portions 100 is reached.

At block 408, a follower-go signal 98 may be received after a period of time. For example, the image processing circuitry 27 may receive the follower-go signal 98 from a hardware source and/or a software source that indicates transitioning to a next frame of display image data. For example, the follower-go signal 98 may indicate a line of the next frame for processing and/or transitioning. The line may be a first line, a third line, a fourth line, or the like. That is, the scheduling of the next frame may be at a line by line granularity. The method 400 may return to block 404 to generate a frame of first display image data 54 and a frame of the second display image data 56, block 406 to instruct a display to display the frame of first display image data 54 and an external display to display the frame of second display image data 56, and/or block 408 to receive the follower-go signal 98 after the period of time. In this manner, the method 400 may cause the external display(s) 28 to transition to the next frames at the same time, which may reduce image artifacts.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112(f).

What is claimed is:

1. An electronic device comprising:

at least one display, wherein the at least one display is configured to be controlled by two or more clock signals comprising a first clock signal and a second clock signal; and image processing circuitry, communicatively coupled to the at least one display, configured to:

synchronize, based on a first time-base value of the first clock signal and a second time-base value of the second clock signal, the two or more clock signals;

receive a frame of image data for display by the at least one display, wherein a period of time to be used to display the frame of image data comprises an active portion and an idle portion;

receive a signal from a controller during the idle portion; and initiate, based on receiving the signal, processing of a line of the frame of image data during the active portion.

2. The electronic device of claim 1, wherein the image processing circuitry is configured to:

receive a duration for presenting the frame of image data; and determine, based on the duration for presenting the frame of image data and a duration of the active portion, a duration for the idle portion.

3. The electronic device of claim 1, wherein the image processing circuitry is configured to:

receive a refresh rate for the at least one display; and determine, based on the refresh rate, a duration for the idle portion.

4. The electronic device of claim 1, wherein the image processing circuitry comprises:

a first image processing circuit configured to drive a first portion of the at least one display; and a plurality of additional image processing circuits configured to drive a second portion of the at least one display.

5. The electronic device of claim 1, wherein the at least one display comprises two or more displays, and wherein the image processing circuitry comprises:

a first image processing circuit configured to drive a first display of the two or more displays; and a second image processing circuit configured to drive a second display of the two or more displays.

6. The electronic device of claim 5, wherein the image processing circuitry is configured to synchronize the first image processing circuit and the second image processing circuit by:

receiving the first time-base value from the first image processing circuit;

receiving the second time-base value from the second image processing circuit; and determining a first synchronized time-base value by selecting a larger of the first time-base value and the second time-base value.

7. The electronic device of claim 6, wherein the image processing circuitry is configured to:

receive a plurality of additional time-base values from an additional image processing circuit; and determine a second synchronized time-base value by selecting a larger of each of the plurality of additional time-base values and the first synchronized time-base value.

8. The electronic device of claim 7, wherein the image processing circuitry is configured to initiate processing, based on the second synchronized time-base value, of the line.

9. The electronic device of claim 6, wherein the image processing circuitry is configured to:

determine a difference between the first time-base value and the second time-base value is greater than a threshold; and transmit, based on the difference being greater than the threshold, an error signal.

10. The electronic device of claim 6, wherein the image processing circuitry is configured to:

determine a difference between the first time-base value and the second time-base value is greater than a threshold; and select, based on the difference being greater than the threshold, the first time-base value.

11. The electronic device of claim 1, wherein a duration of the idle portion is configurable.

12. An electronic device comprising:

at least one external display configured by two clock circuits, wherein the at least one external display is communicatively coupled to the electronic device; and image processing circuitry communicatively coupled to the at least one external display, wherein the image processing circuitry is configured to:

receive a first time-base value and a second time-base value from the two clock circuits, respectively;

synchronize, based on the first time-base value and the second time-base value, the two clock circuits;

receive a frame of image data for display by the at least one external display, wherein a period of time to be used to display the frame of image data comprises an active portion and an idle portion;

receive a signal from a software source during the idle portion to transition to a first line of a subsequent frame of image data; and initiate, based on receiving the signal, processing of the subsequent frame of image data.

13. The electronic device of claim 12, wherein initiating the processing of the subsequent frame of image data comprises:

instructing, based on receiving the signal, the at least one external display to process the first line of the subsequent frame of image data.

14. The electronic device of claim 12, wherein the image processing circuitry is configured to insert one or more idle portions based on lapse of an active portion of the subsequent frame of image data and based on not receiving the signal from the software source.

15. The electronic device of claim 12, wherein the two clock circuits are disposed within the electronic device.

16. Image processing circuitry configured to perform one or more operations comprising:

synchronizing, based on at least two time-base values from two clock circuits driving at least one display, the two clock circuits;

receiving a frame of image data for display by the at least one display, wherein a period of time used to display the frame of image data comprises an active portion and an idle portion;

receiving a signal from a software source during the idle portion to transition to a first line of a subsequent frame of image data; and initiating, based on receiving the signal, processing of the first line of the subsequent frame of image data.

17. The image processing circuitry of claim 16, wherein synchronizing the two clock circuits comprises:

receiving a first time-base value corresponding to a first clock of the two clock circuits;

receiving a second time-base value corresponding to a second clock of the two clock circuits; and selecting, based on a larger of the first time-base value and the second time-base value, a synchronization time-base value.

18. The image processing circuitry of claim 16, wherein the one or more operations comprise:

inserting one or more idle portions based on lapse of the active portion of the subsequent frame of image data and based on not receiving the signal from the software source.

19. The image processing circuitry of claim 18, wherein the one or more operations comprise:

receiving a refresh rate for the at least one display; and determining, based on the refresh rate, a duration for the idle portion.

20. The image processing circuitry of claim 16, wherein the one or more operations comprise:

receiving a duration of the period of time for presenting the frame of image data; and determining, based on the duration of the period of time and a duration of the active portion, a duration for the idle portion.

* * * * *